(12) United States Patent
Wilde et al.

(10) Patent No.: US 6,311,044 B1
(45) Date of Patent: Oct. 30, 2001

(54) METHOD AND APPARATUS FOR DETERMINING FAILURE MODES OF A TRANSCEIVER

(75) Inventors: David Wilde, Cary; John Kelley, Palatine, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/063,463

(22) Filed: Apr. 20, 1998

(51) Int. Cl.[7] .............................. H04B 1/38; G01R 31/28
(52) U.S. Cl. .......................... 455/73; 455/67.1; 455/115; 455/423; 455/561; 375/221; 714/716; 324/158.1
(58) Field of Search ................................. 455/73, 75, 76, 455/80, 82, 83, 115, 126, 127, 129, 113, 116, 423–425, 67.1, 67.4, 226.1, 226.4, 561; 330/129, 136, 149, 127; 375/296, 297

(56) References Cited

U.S. PATENT DOCUMENTS

| | | | |
|---|---|---|---|
| 5,144,258 | * | 9/1992 | Nakanishi et al. .................... 455/126 |
| 5,337,316 | | 8/1994 | Weiss et al. . |
| 5,481,186 | * | 1/1996 | Heutmaker et al. .................. 455/115 |
| 5,521,902 | * | 5/1996 | Eriksson et al. ..................... 455/67.4 |
| 5,574,993 | * | 11/1996 | Kobayashi et al. .................. 455/126 |
| 5,742,589 | * | 4/1998 | Murata ................................ 455/67.4 |
| 5,903,823 | * | 5/1999 | Moriyama et al. ................... 455/126 |
| 5,960,333 | * | 9/1999 | Repke et al. ......................... 455/126 |
| 5,987,314 | * | 11/1999 | Saito .................................. 455/226.1 |

* cited by examiner

*Primary Examiner*—Lester G. Kincaid
(74) *Attorney, Agent, or Firm*—Sayed H. Beladi; Kenneth A. Haas; L. Bruce Terry

(57) ABSTRACT

A method for determining failure modes of a transceiver (100) includes applying a control signal (121) to a transmitter (130) of transceiver (100). The power level of a transmit signal (131) is proportional to a predetermined voltage level of control signal (121), and is detected by a detector (132) which correspondingly produces a transmit power level indicator (133). A portion of transmit signal (131) is coupled to produce a coupled transmit signal (111) which is received by a receiver (110) of transceiver (100). Receiver (111) produces a receive signal strength indicator (112) corresponding to the power level of coupled transmit signal (111). Voltage levels of received signal strength indicator (112), transmit power level indicator (133) and predetermined voltage level of control signal (121) are stored in a memory means 125, and compared in a controller 126 to determine failure modes of receiver (110) and transmitter (130).

15 Claims, 1 Drawing Sheet

METHOD AND APPARATUS FOR DETERMINING FAILURE MODES OF A TRANSCEIVER

FIELD OF THE INVENTION

The present invention relates generally to a transceiver, and more particularly to a transceiver that has self-testing capability.

BACKGROUND OF THE INVENTION

A transceiver normally includes a receiver, a transmitter, and an associated control circuitry. The receiver and the transmitter may be on a single module, or incorporated over several modules even though the receiver and transmitter work together as a single transceiver unit. Transceivers are used in many different applications. One such an application is in cellular basestations in a cellular communication system. Cellular base stations are normally mounted at locations that are not easily accessible. As a result, maintenance or trouble shooting of the transceivers are difficult and time consuming tasks.

In prior art, transceivers are incorporated to have a self-testing capability for determining failure of the transceiver, thus, eliminating a need for a physical access to the transceiver board for testing purposes. Such a self-testing capability is disclosed in a patent issued to Weiss et al on Aug. 9, 1994, U.S. Pat. No. 5,337,316 (316 patent), title: "Transceiver Self-Diagnostic Testing Apparatus and Method", assigned to Motorola, Inc., herein incorporated by reference.

To eliminate false positive failure diagnosis of the transceiver boards, and make the trouble shooting an efficient task, the diagnosis of a transceiver however should provide sufficient information about the failure mode and its characteristic. The solution provided by prior art, therefore, is further enhanced by a transceiver capability which allows determining characteristic of a failure mode, and whether the transceiver failure is due to a failure of the receiver or transmitter or both.

DETAILED DESCRIPTION OF THE PREFERRED EMBODIMENT(S)

Figure 1:
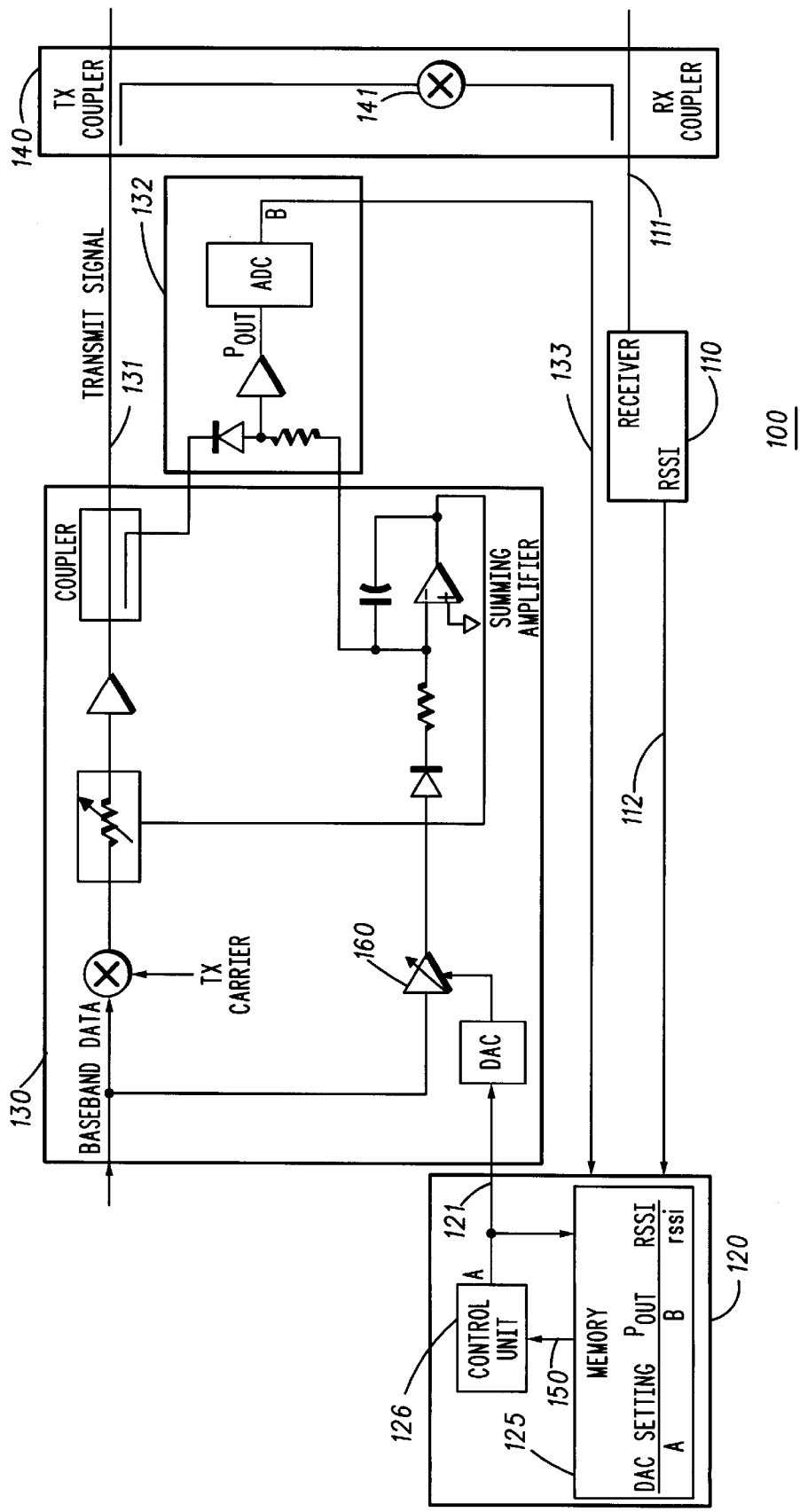
FIG. 1 depicts a block diagram of a transceiver according to various embodiments of the invention.

According to an embodiment of the invention, a method for determining failure mode of a transceiver includes applying a control signal at a predetermined voltage level to a power control input of an amplifier in a transmitter of the transceiver. The power level of a transmit signal is proportional to the predetermined voltage level of the control signal. A detector detects the power level of the transmit signal at an output of the transmitter, and produces a transmit power level indicator corresponding to the power level of the transmit signal. A portion of the transmit signal is coupled to produce a coupled transmit signal. The coupled transmit signal is received by a receiver of the transceiver. The receiver produces a receive signal strength indicator corresponding to the power level of the coupled transmit signal. Voltage levels of the received signal strength indicator, the transmit power level indicator and the predetermined voltage level of the control signal are compared to determine failure of the receiver and transmitter.

When the predetermined voltage level of the control signal, and the levels of the received signal strength indicator and the transmit power level indicator are positively comparable, the receiver and transmitter are in an operable condition without failure. In another situation, when the transmit power level indicator and the level of the received signal strength indicator are not positively comparable, the receiver is in a failure mode. In another situation, when the predetermined voltage level of the control signal and level of the transmit power level indicator are not positively comparable, the transmitter is in a failure mode. In another situation, when the predetermined voltage level of the control signal and the level of the transmit power level indicator are not positively comparable, and levels of the transmit power level indicator and receive signal strength indicator are positively comparable, the transmitter is in a failure mode, and the receiver is in an operable condition without failure. In another situation, when the predetermined voltage level of the control signal and the level of the transmit power level indicator are not positively comparable, and the levels of the transmit power level indicator and receive signal strength indicator are not positively comparable, the transmitter and receiver are in a failure mode.

According to an enhancement that the invention provides over prior art, failure conditions of the receiver and transmitter may be determined independently since one or more comparisons are made between levels of the control signal, the transmit power level indicator and receive signal strength indicator. If the predetermined voltage level of the control signal and the level of the transmit power level indicator are not positively comparable such that the transmit power level indicator is indicating for example 5–10 dB lower signal level than expected based on the predetermined voltage level of the control signal, the transmitter failure is characterized as a soft failure mode. In soft failure mode, transmitter may be usable for some application until a repair can be made to correct the problem. Such a failure characterization for extending the usability of the transceiver is another enhancement over prior art. Moreover, when the transmit power level indicator is indicating 5–10 dB lower signal level, the receive signal strength indicator in comparison with the transmit power level indicator should also show 5–10 lower coupled signal level. If such a lower signal level is also measured at the receiver, it indicates that the receiver is in a working condition, and only the transmitter is in a failure mode.

To make a proper and efficient repair at a remote repair facility, the voltage levels of the transmit power level indicator, receive signal strength indicator and the predetermined voltage level of the control signal are stored in a memory block in the transceiver board. At the repair facility, the stored information is retrieved to determine the failure mode of the transceiver by making a comparison of the stored data. This data is important because it indicates the condition of the failure mode at the time that the failure occurred. For example, if the failure is not repeatable when the transceiver is at a repair facility, the stored data becomes useful for finding the root cause of the problem at the time that the failure occurred.

The transmit power level indicator, receive signal strength indicator and the predetermined voltage level may need to be converted from digital to analog or from analog to digital at various sections of the transceiver to effectively make the comparison, and storing the data in a memory device. Since transceivers are normally expected to operate in a wide range of frequencies, and the receive frequency may be different than the transmit frequency, carrier frequency of the coupled transmit signal is translated to a frequency that is compatible with a receive frequency of the receiver.

To effectively account for various losses or gains in the transceiver before the making a comparison of the data, one or more calibration of the transceiver at a time before the installation may be required. For example, such calibration may be performed at the factory. Once a calibration is performed, the calibration data is stored in the transceiver memory section. The calibration information corresponds to the control signal predetermined voltage level, the transmit power level indicator level, and the received signal strength indicator level. The calibration information is retrieved from the memory section to account for losses and gains in the transceiver for determining operability of the receiver and transmitter before the comparing step.

To perform a calibration, the control signal at a predetermined voltage is applied to the transmitter. While the control signal is applied, voltage levels of the transmit power level indicator and the received signal level indicator are stored. As a result, a table may created for convenience that includes voltage levels of the control signal that are corresponding to voltage levels of the transmit power level indicator and the received signal level indicator. The calibration information may include calibration information at a number of the predetermined voltage levels to gather a complete calibration data. Such a complete calibration data would include information at various transmit power level. For example, in a situation that the transmit power level is 5–10 dB lower than expected, a received signal strength indicator corresponding to 5–10 dB lower transmit power level is available in the calibration data to make the comparison at the lower received signal level. Such a comparison is needed in case the transmitter is in a soft failure mode, moreover, the comparison is used to determine whether the receiver is operating without failure. The calibration information may include calibration information at a number of carrier frequencies of the transmit signal, and a number of receive frequency of the receiver.

According to various embodiment of the invention, self-testing capability of a transceiver is greatly enhanced by determining characteristic of the failure modes, such as total failure or soft mode failure modes, and whether the transmitter or receiver or both are in a failure condition. The diagnostic data is stored in a memory device for retrieval at a later time, thus making an efficient remote repair.

Referring to FIG. 1, a block diagram of a transceiver 100 according to various embodiments of the invention is shown. Transceiver 100 includes a receiver 110, a transmitter 130, a power detector 132 coupled to transmitter 130 for detecting power level of a transmit signal at an output 131 of transmitter 130. Power detector 132 produces a transmit power level indicator 133 proportional to power level of the transmit signal. A coupler 140 diverts a coupled portion of the transmit signal power level to an input 111 of receiver 110 to produce a received signal strength indicator 112 proportional to the coupled portion of the transmit signal. A controller 120 coupled to receiver 110 for receiving received signal strength indicator 112, transmitter 130 for input a control signal 121 to control power level of an amplifier 160 which amplifies the transmit signal at output 131, and power detector 132 for receiving transmit power level indicator 133. Controller 120 includes a memory means 125, such as a memory device, for storing signal levels of received signal strength indicator 112, transmit power level indicator 133 and control signal 121. Means 125 may also be used for storing calibration information. Controller 120 includes a means 126, such as a microcontroller, for comparing signal levels of received signal strength indicator 112, transmit power level indicator 133 and control signal 121. Coupler 140 may include a means 141 for carrier frequency translation of the coupled transmit signal to be compatible with a receive frequency of receiver 110. Transceiver 100 provides the necessary capability to perform a self-test routine that includes the characterization of the failure modes by including power detector 132, and memory means 125.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method for determining failure mode of a transceiver, comprising the steps of:

applying a control signal at a predetermined voltage level to a power control input of an amplifier in a transmitter portion of said transceiver;

detecting a power level of a transmit signal at an output of said transmitter and producing a transmit power level indicator corresponding to said power level of said transmit signal, wherein power level of said transmit signal is proportional to said predetermined voltage level of said control signal;

coupling said transmit signal to produce a coupled transmit signal;

receiving said coupled transmit signal by a receiver portion of said transceiver;

producing by said receiver a receive signal strength indicator corresponding to a power level of said coupled transmit signal; and comparing levels of said receive signal strength indicator, said transmit power level indicator and said predetermined voltage level of said control signal to determine a failure mode of said transceiver, wherein said failure modes include a failure of said receiver, said transmitter, and said receiver and transmitter.

2. The method as recited in claim 1 further comprising steps of:

storing voltage levels of said transmit power level indicator, receive signal strength indicator and said predetermined voltage level of said control signal; and retrieving said stored voltage levels before said comparing step.

3. The method as recited in claim 1 further comprising a step of converting at least one of said transmit power level indicator, receive signal strength indicator and said predetermined voltage level to a digital format.

4. The method as recited in claim 1 further comprising a step of converting at least one of said transmit power level indicator, receive signal strength indicator and said predetermined voltage level to an analog format.

5. The method as recited in claim 1 further comprising a step of translating a carrier frequency of said transmit signal to be compatible with a receive frequency of said receiver.

6. The method as recited in claim 1 further including the step of determining that said receiver and transmitter are in an operable condition in response to said comparing of said control signal and said levels of said receive signal strength indicator and said transmit power level indicator being substantially equal to expected comparisons.

7. The method as recited in claim 1 further including the step of determining said receiver is in a receiver failure mode in response to said comparing of said transmit power level indicator and said receive signal strength indicator not being substantially equal to an expected comparison.

8. The method as recited in claim 1 further including the step of determining said transmitter is in a transmitter failure mode in response to said comparing of said predetermined level of said control signal and said transmit power level indicator not being substantially equal to an expected comparison.

9. The method as recited in claim 1 further including the step of determining said transmitter is in a transmitter failure mode and said receiver is in an operable condition in response to said comparing of said predetermined level of said control signal and said transmit power level indicator not being substantially equal to an expected comparison, and said comparing of said transmit power level indicator and said receive signal strength indicator being substantially equal to an expected comparison.

10. The method as recited in claim 1 further including the step of determining said transmitter is in a transmitter failure mode and said receiver is in a receiver failure mode in response to said comparing of said predetermined level of said control signal and said transmit power level indicator not being substantially equal to an expected comparison, and said comparing of said transmit power level indicator and said receive signal strength indicator not being substantially equal to an expected comparison.

11. The method as recited in claim 1 further comprising the steps of:

storing calibration information corresponding to said control signal predetermined voltage level, said transmit power level indicator level, and said received signal strength indicator level in a memory at an initial time; and retrieving said calibration information at a time later than the initial time for determining failure modes of said receiver and transmitter in said comparing step.

12. The method as recited in claim 11 further comprising the step of obtaining said calibration information at said initial time by applying said control signal at said predetermined voltage level.

13. The method as recited in claim 12 wherein said calibration information comprises calibration information at a plurality of said predetermined voltage levels.

14. The method as recited in claim 12 wherein said calibration information comprises calibration information at a plurality of said carrier frequencies of said transmit signal.

15. The method as recited in claim 12 wherein said calibration information comprises calibration information at a plurality of said receive frequencies of said receiver.

* * * * *